J. M. OGLESBY.
WING ATTACHMENT.
APPLICATION FILED DEC. 19, 1912.
1,078,371.  Patented Nov. 11, 1913.
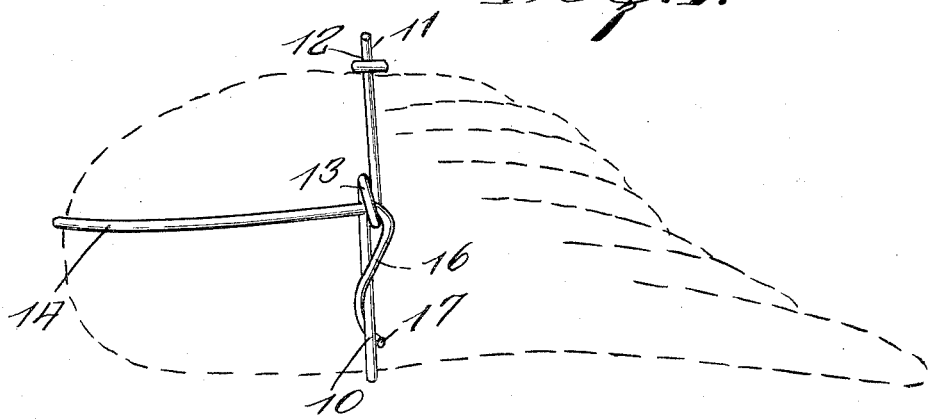
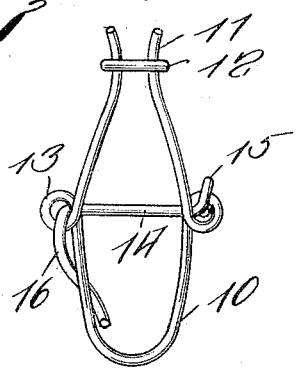
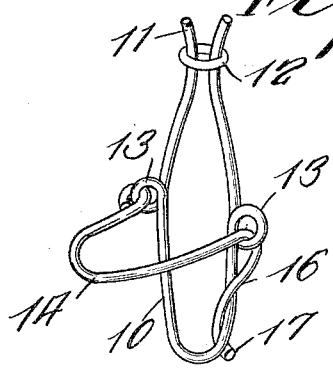
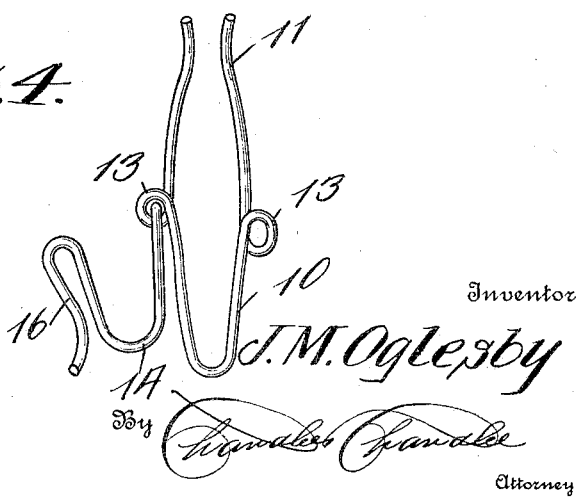

UNITED STATES PATENT OFFICE.

JOHN M. OGLESBY, OF GREEN POND, ALABAMA.

WING ATTACHMENT.

1,078,371.   Specification of Letters Patent.   Patented Nov. 11, 1913.

Application filed December 19, 1912. Serial No. 737,730.

*To all whom it may concern:*

Be it known that I, JOHN M. OGLESBY, a citizen of the United States, residing at Green Pond, in the county of Bibb, State of Alabama, have invented certain new and useful Improvements in Wing Attachments; and I do hereby declare the following to be a full, clear, and exact description of the invention, such as will enable others skilled in the art to which it appertains to make and use the same.

This invention relates to improvements in wing attachments and has particular reference to a device for attachment to the wings of turkeys or the like to prevent them from flying.

The principal object is to provide a simple device of this character which may be quickly and easily applied to the wing of the fowl without injury or discomfort to the fowl, other than the discomfort incident to the restraint as to its flying.

Other objects and advantages will be apparent from the following description and with particular reference to the accompanying drawings.

In the drawings: Figure 1 is an elevation of a wing showing my invention applied, Fig. 2 is a rear elevation of the attachment removed from the wing, Fig. 3 is a perspective view of the device detached and in closed position, and Fig. 4 is a perspective view of the device detached but in open position.

Referring particularly to the accompanying drawings, 10 represents a loop of wire having its free end 11 bent slightly outward, and adapted to receive a clamping ring 12. At intermediate points on the sides of the members of the loops are formed the single coil turns 13. This forms one member of my wing attachment, and is adapted to be placed transversely of the wing, as clearly shown in Fig. 1 of the drawings.

A second loop 14 has one of its ends passed through one of the loops or eyes, 13, and bent backwardly to form pivotal connections between the loops, as indicated at 15. The opposite end of the loop 14 is bent into a substantially S formation, as indicated at 16, this end being adapted to be inserted through the other of the loops or eyes 13 and have its terminal 17 engaged around one side of the loop 10 adjacent the eyes 13. This loop 14 engages the wing longitudinally, the closed portion of the loop embracing the wing at the point close to the body of the bird.

To apply the device, the rings 12, are first removed from the ends 11 of the loop 10, said loop is placed so that it straddles the wing transversely, after which the ring 12 is applied and the ends 11 are squeezed together and the ring 12 applied. The loop 14 is engaged around the wing from the inner end and has its S-shaped end passed through the loop 13 and the hook engaged around the adjacent portion of the loop 15. When thus applied, the bird can not spread its wings, and hence is unable to fly. The device can be conveniently and comfortably worn by turkeys and chickens and the like but will effectively prevent them from flying over fences.

What is claimed is:

A fetter for a bird's wing comprising a loop of wire embracing the wing transversely and having eyes formed on each side thereof, means for holding the ends of the loop closed, a second loop of wire embracing the wing longitudinally from the pinion of the wing, one end of the wire of the second loop being pivotally connected to one of the eyes of the first loop, the other end of the wire of the second loop being passed through the other eye, and a hook on the last-named end for engagement with one side of the first loop adjacent the last-named eye.

In testimony whereof, I affix my signature, in the presence of two witnesses.

JOHN M. OGLESBY.

Witnesses:
M. B. SHACKELFORD,
W. H. ELLIS.

---

Copies of this patent may be obtained for five cents each, by addressing the "Commissioner of Patents, Washington, D. C."